Figure 1:
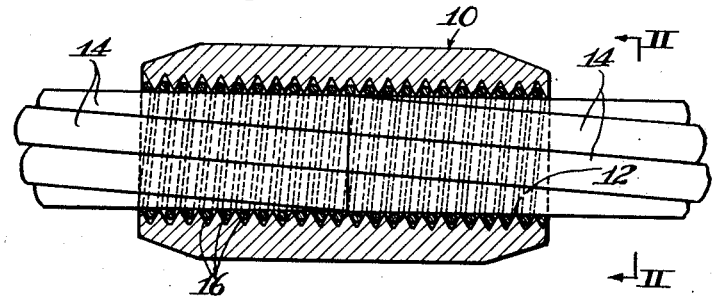

July 1, 1941.    R. TEMPLE, JR    2,247,928
COUPLING
Filed Dec. 29, 1938

INVENTOR.
Robert Temple, Jr.
BY Brown, Critchlow & Flick
his ATTORNEYS.

Patented July 1, 1941

2,247,928

UNITED STATES PATENT OFFICE 2,247,928

COUPLING

Robert Temple, Jr., Pittsburgh, Pa.

Application December 29, 1938, Serial No. 248,292

6 Claims. (Cl. 287—75)

This invention relates to couplings or connections, as, for example, employed in joining together wires, rods, tubes, or other elongated members or strand elements, and to improved methods for making such couplings or connections.

The general object of my invention is the provision of strong, light weight couplings or connections for joining elongated members, such as wires, rods, tubes and the like, and improved methods of making such couplings or connections.

A specific object of my invention is the provision of a rapid and inexpensive method for joining together elongated members such as strand elements in substantially end-to-end relation so as to produce a connection having a strength approximately equal to or even greater than the strength of the elongated members joined together but which is relatively light in weight.

Another object of my invention is the provision of an improved coupling or joint between the ends of electrical conductors, which joint is inexpensive, easily produced, approaches or even exceeds the strength of the wires connected, possesses excellent electrical conductivity, and is light in weight so that it can be positioned in long spans.

The foregoing and other objects of my invention are achieved by the provision of a joint or coupling comprising a metal sleeve having a threaded bore therethrough, a pair of strand elements having their ends received in opposite ends of the bore, and a helically coiled spring carried in the bore between the sleeve and the strand elements. The spring is of a relatively harder metal than the sleeve and strand elements, and the sleeve is compressed to a polygonal shape in cross section to force it about the spring and strand elements, so as to embed the spring in both the sleeve and the strand elements and so as to cause those portions of the sleeve and strand elements lying between the convolutions of the spring to be in intimate engagement with each other so that at least part of the threads of the sleeve bore are embedded in the strand elements.

In accordance with the method of my invention I select a substantially round metal sleeve having a bore adapted to receive the ends of the elongated members or strand elements. The sleeve is threaded internally and a metal spring substantially the same length as the sleeve and of a harder metal is screwed into the internal thread on the sleeve. The ends of the elongate members are then inserted into the opposite ends of the sleeve and the sleeve is compressed to a polygonal shape in cross section by externally applied pressure to force the sleeve about the ends of the conductors and to embed the spring in the conductors.

Figure 2:
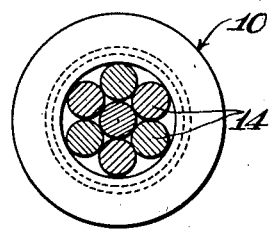
Figure 3:
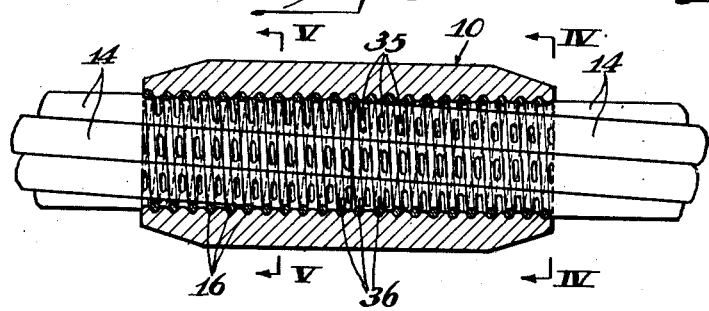
Figure 4:
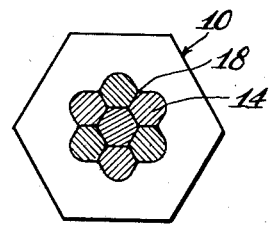
Figure 5:
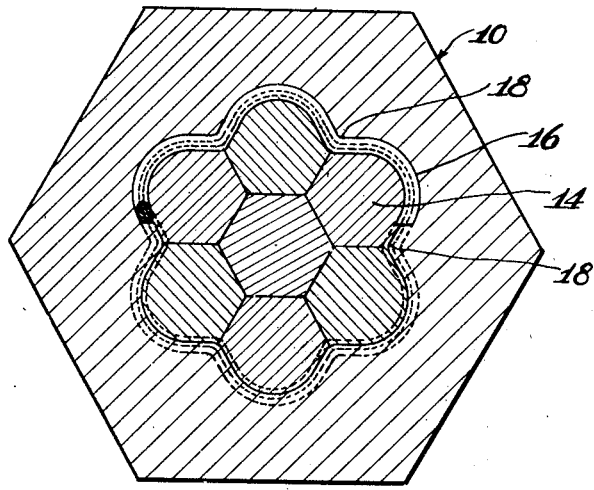
Figure 6:
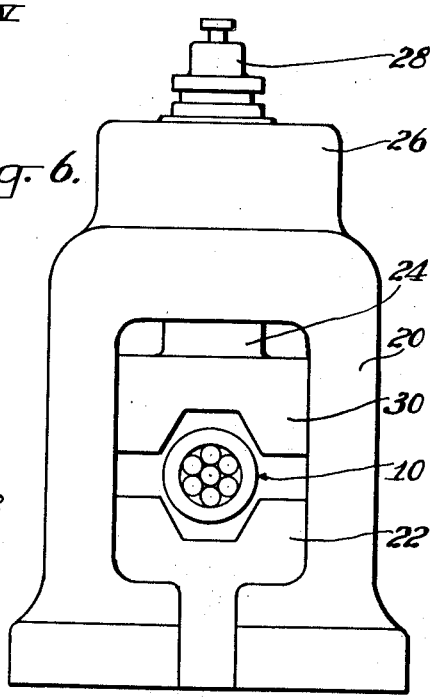

For a better understanding of my invention reference should be had to the accompanying drawing wherein Fig. 1 is a longitudinal cross-sectional view through a coupling or connector incorporating the principles of my invention and showing the parts before the sleeve has been compressed about the ends of the members to be joined together; Fig. 2 is a cross-sectional view taken on the line II—II of Fig. 1; Fig. 3 is a view similar to Fig. 1, but illustrates the joint of Fig. 1 after the sleeve has been compressed radially about the ends of the members to be joined together; Fig. 4 is a view similar to Fig. 2, taken on line IV—IV of Fig. 3; Fig. 5 is a fragmentary cross-sectional view taken on the line V—V of Fig. 3 and illustrates the manner in which the spring of my improved joint embeds itself between the sleeve and the strand elements which are joined together; and Fig. 6 is a side elevation of a suitable apparatus for practicing my invention.

Although the principles of my invention are broadly applicable to connecting elongated members and strand elements of various kinds together in end-to-end relation and with many of the advantages of my invention being realized, nevertheless my improved coupling is particularly adapted to be used for joining electrical conductors together and accordingly has been so illustrated and will be so described.

Specifically referring to the drawing, the numeral 10 indicates generally a metal sleeve having a longitudinal bore 12 therethrough of a size adapted to receive and closely surround the ends of electrical conductors or elongate members 14 which have been illustrated as twisted wire cables. Positioned between the sleeve 10 and the ends of the cables 14 is a helically coiled metal spring 16, which is preferably made of a metal which is relatively hard and at least harder than the metal of the sleeve 10 and the metal of the strand elements 14. When my improved coupling is used to connect electrical conductors such as copper wires or cables together, the sleeve 10 is also made of copper and the spring 16 may then be made of bronze which is harder than the copper of the sleeve or the wire cables but which possesses relatively favorable electrical conductivity. Preferably in the practice of my invention, the bore 12 of the sleeve 10 is threaded internally, usually with a V-thread as shown in Fig. 1, so that the spring 16 can be screwed or turned into the thread in the bore to position the convolutions of the spring 16 at the bottom of the roots of the threads cut on the interior of the bore.

After the spring 16 is screwed into or positioned inside of the sleeve, the ends of the cables 14 are introduced into the opposite ends of the sleeve. Then with the parts of the coupling assembled as just described and as particularly shown in Fig. 1 of the drawing, the sleeve is thereafter subjected to radially applied pressure over its outer periphery. While broadly I contemplate applying radial pressure by any known means or in any known manner, I have found that particularly beneficial results, such as complete flow and compacting of the metal, follow the application of pressure in the form of a blow delivered by a detonated explosive charge.

In Fig. 6 I have illustrated one suitable apparatus for utilizing the force of a detonated explosive charge to drive dies about the outer periphery of a sleeve which receives the ends of the cables to be joined together. The apparatus shown in Fig. 6 is substantially that illustrated in Fig. 1 of my Patent No. 2,030,803, and thus needs no detailed description. Suffice it to say that in Fig. 6, the numeral 20 indicates a frame which removably carries a bottom die 22 in fixed relation. The frame 20 slidably carries a piston 24 in a cylinder 26 and the piston is adapted to be driven toward the fixed die 22 by means of a detonated explosive charge received in a removable breech portion and firing mechanism mounted on the upper end of the cylinder 26 and indicated as a whole by the numeral 28. The piston 24 removably carries an upper or movable die 30 which cooperates with the lower or fixed die 22. The dies 22 and 30 are formed with complemental polygonal openings 32 which are adapted to receive the sleeve 10 and strand elements 14 in the joining operation, as will be understood.

When the sleeve 10 is radially compressed about the ends of the cables 14, the relation of the parts becomes that illustrated in Figs. 3, 4, and 5. Specifically, the round sleeve 10 is changed to a hexagonal or other polygonal shape in the cross section of its periphery and is also reduced in diameter so as to flow, compress, and compact the metal of the sleeve into very intimate load-bearing engagement with the ends of the cables 14. Thus the metal of the sleeve 10 is in substantially perfect electrical conductivity with the metal of the cables 14 between the convolutions of the spring 16. The relatively sharp crests of the V-threads embed themselves in the ends of the cables and form grooves 35 therein as shown in Fig. 3. In the valleys between the individual wires on the periphery of the cable the threads on the inside of the sleeve are ordinarily distorted very little during the compacting operation, but adjacent the individual wires the threads are flattened during the embedding thereof in the wires of the cable to provide a very intimate interlocking engagement between the surfaces. Furthermore, the convolutions of the spring 16 have been firmly embedded in the surfaces of both the sleeve 10 and the ends of the cables 14. In Fig. 3 of the drawing, the indentations made by the spring 16 in the cables 14 have been indicated by the numeral 36. The combination of the features described in this paragraph insures a particularly satisfactory mechanical connection between the sleeve 10 and the ends of the cables 14 which enables the joint to withstand axial pull and tensional stresses up to and even greater than those which will break the strand element itself.

I have found that compressing the sleeve with the high velocity, high pressure blow of the press shown in Fig. 6 acts also to decrease the diameter of each individual convolution of the spring 16. This decrease in diameter of the convolutions results in permanent offsets or crimps in the spring 16 which result in further interlocking of the spring 16 in the ends of the cables 14. When multi-wire cables such as shown at 14 are being joined together, rather than solid wires, the crimps or offsets formed in the spring 16 due to its reduction in diameter usually occur in the valleys or grooves between the twisted wires. Specifically, the convolutions of the spring 16 are offset between each of the individual wires of the cable so that inwardly directed offsets or lugs 18 (see Fig. 5) are formed on the spring 16. The inwardly directed lugs 18 engaging between each pair of wires on the outer periphery of the wire cables form interlocking means which materially increase the strength of the joint due to the fact, among others, that the twist of the wires of the cables materially aids in the interlocking action.

It will be understood that the metal of the sleeve 10 also is offset or flows into the crevices or valleys between the individual wires on the outer periphery of the cables so that a further bonding of the sleeve 10, spring 16, and the ends of the cables 14 follows. I have found that changing the shape of the sleeve 10 from a round to a polygonal shape during the application of radial pressure improves the characteristic of the flow of metal of the sleeve and also improves the upsetting and offsetting of the spring 16. However, it should be appreciated that many of the advantages of my invention can be retained even though the sleeve 10 is compressed to a round, rather than a polygonal, shape.

From the foregoing it will be recognized that the objects of my invention have been achieved by the provision of an improved method for making a relatively light weight and inexpensive coupling or joint which is particularly strong in tension and which possesses excellent electrical characteristics. My improved joint can be readily made in the field by the ordinary workman with little or no training or supervision and because of its high strength and low weight is particularly adapted for use in long spans. Furthermore, because of the small size of my improved joint, it adapts itself to connections in electrical insulations, fuse boxes, and other confined spaces where length and size of connections are of paramount importance.

Although I have shown my connection or coupling in conjunction with wire cables for which it is particularly adapted, it will be recognized that many of the advantages of my invention are retained when joining solid strand conductors or wires. Also, while I have stressed the advantages of my improved joint and method of making it in conjunction with electrical connections wherein the strand members connected and the sleeve are of aluminum or copper and the spring is bronze or a phosphorus bronze of good electrical conductivity although relatively hard, it should be fully understood that following the teaching of my invention I can connect steel, iron, or other metallic elongated members or strand elements end to end with a steel, iron, or other metallic sleeve, and utilize a hardened steel spring if such mechanical connections are to be made. Further, instead of connecting elongated members together end to end, I particularly contemplate connecting eyes, sockets, and the like to only one end of an elongate member.

Thus, while I have, in accordance with the patent statutes, particularly illustrated and described one embodiment of my invention and one manner of practicing my improved method, nevertheless it will be appreciated that my invention is not to be limited thereto or thereby, but is defined in the appended claims.

I claim:

1. In combination, a metal sleeve having a bore therein, a strand element having its end received in an end of the bore, and a helically coiled spring extending in the bore between the sleeve and the strand element and having at least most of its convolutions spaced apart, said spring being of a metal at least as hard as the sleeve or strand element, said sleeve being compressed about the spring and strand element so as to embed the spring in both the sleeve and the strand element and so as to cause those portions of the sleeve and strand element lying between substantially each convolution of the spring to be in intimate engagement with each other.

2. In combination, a metal sleeve having a threaded bore therein, an elongated member having its end received in the bore, and a helically coiled spring extending in the bore between the sleeve and the elongated member, said spring being of a metal at least as hard as the sleeve or elongated member, said sleeve being compressed about the spring and elongated member so as to embed the spring in both the sleeve and elongated members and so as to cause the threaded portions of the sleeve lying between substantially each convolution of the spring to be in embedded engagement with the elongated member.

3. In combination, a metal sleeve having a bore therethrough, a pair of strand elements having their ends received in opposite ends of the bore, and a helically coiled spring extending substantially completely through the bore between the sleeve and the strand elements and having at least most of its convolutions spaced apart, said spring being of a metal at least as hard as the sleeve or strand elements, said sleeve being compressed about the spring and strand elements so as to embed the spring in both the sleeve and strand elements and so as to cause those portions of the sleeve and strand elements lying between the convolutions of the spring to be in intimate engagement with each other, said spring having the diameter of its convolutions reduced and having crimps or offsets formed circumferentially of the spring to provide further interlocking between the sleeve and strand elements.

4. In combination, a metal sleeve having a threaded bore therethrough, a pair of twisted wire cables having their ends received in opposite ends of the bore, and a helically coiled spring extending substantially completely through the bore between the sleeve and the cables, said spring being of a metal at least as hard as the sleeve or cables, said sleeve being compressed about the spring and cables so as to embed the spring in both the sleeve and cables and so as to cause the threaded portions of the sleeve lying between the convolutions of the spring to be in embedded engagement with the cables, the diameter of the convolutions of the spring being reduced to form radially inwardly extending crimps or offsets in the spring in the region of the valleys between the wires of each cable.

5. In combination, a metal sleeve having a bore therethrough, a pair of twisted wire cables having their ends received in opposite ends of the bore, and a helically coiled spring extending substantially completely through the bore between the sleeve and the cables and having at least most of its convolutions spaced apart, said spring being of a metal at least as hard as the sleeve or cables, said sleeve having a polygonal shape in cross section and being compressed about the spring and cables so as to embed the spring in both the sleeve and cables and so as to cause those portions of the sleeve and cables lying between the convolutions of the spring to be in intimate engagement with each other, the diameter of the convolutions of the spring being reduced to form radially inwardly extending crimps or offsets in the spring in the region of the valleys between the wires of each cable.

6. In combination, a copper sleeve having a threaded bore therethrough, a pair of copper cables having their ends received in opposite ends of the bore, and a helically coiled spring threaded into and substantially completely through the bore between the sleeve and the cables, said spring being of an electro-conductive bronze which is harder than the sleeve or cables, said sleeve having a polygonal shape in cross section and being compressed about the spring and cables so as to embed the spring in both the sleeve and cables and so as to cause those portions of the sleeve and cables lying between the convolutions of the spring to be in intimate roughly threaded engagement with each other, the diameter of the convolutions of the spring being reduced to form radially inwardly extending crimps or offsets in the spring in the region of the valleys between the wires of each cable.

ROBERT TEMPLE, Jr.